US009459979B2

(12) United States Patent
Cain, III et al.

(10) Patent No.: US 9,459,979 B2
(45) Date of Patent: Oct. 4, 2016

(54) DETECTION OF HARDWARE ERRORS USING REDUNDANT TRANSACTIONS FOR SYSTEM TEST

(71) Applicant: International Business Machines Corporation, Armonk, NY (US)

(72) Inventors: Harold W. Cain, III, Katonah, NY (US); David M. Daly, Croton-on-Hudson, NY (US); Kattamuri Ekanadham, Mohegan Lake, NY (US); Michael C. Huang, Rochester, NY (US); Jose E. Moreira, Irvington, NY (US); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 13/962,768

(22) Filed: Aug. 8, 2013

(65) Prior Publication Data

US 2015/0046758 A1    Feb. 12, 2015

(51) Int. Cl.
| | |
|---|---|
| *G06F 11/273* | (2006.01) |
| *G06F 11/16* | (2006.01) |
| *G06F 11/22* | (2006.01) |
| *G06F 11/26* | (2006.01) |
| *G06F 11/263* | (2006.01) |
| *G06F 11/18* | (2006.01) |

(52) U.S. Cl.
CPC ......... *G06F 11/273* (2013.01); *G06F 11/1608* (2013.01); *G06F 11/181* (2013.01); *G06F 11/2242* (2013.01); *G06F 11/26* (2013.01); *G06F 11/263* (2013.01); *G06F 11/1629* (2013.01); *G06F 11/18* (2013.01)

(58) Field of Classification Search
CPC ........... G06F 11/1608; G06F 11/1629; G06F 11/1637; G06F 11/18; G06F 11/181; G06F 11/182; G06F 11/183; G06F 11/1641; G06F 11/1645; G05B 2219/24187
See application file for complete search history.

(56) References Cited

U.S. PATENT DOCUMENTS

| | | | | |
|---|---|---|---|---|
| 4,456,952 | A * | 6/1984 | Mohrman et al. .............. | 714/11 |
| 5,434,997 | A * | 7/1995 | Landry et al. ................. | 714/12 |
| 5,732,209 | A * | 3/1998 | Vigil et al. ..................... | 714/30 |
| 7,213,170 | B2 | 5/2007 | Shidla et al. | |
| 7,743,285 | B1 * | 6/2010 | Aggarwal et al. ............. | 714/43 |
| 7,793,187 | B2 * | 9/2010 | Wong et al. ................... | 714/736 |
| 2003/0191607 | A1 * | 10/2003 | Arndt et al. .................. | 702/186 |
| 2008/0104467 | A1 * | 5/2008 | Satsukawa ..... G01R 31/318552 | 714/729 |
| 2013/0019083 | A1 * | 1/2013 | Cain, III ............ G06F 11/1492 | 712/203 |
| 2013/0326289 | A1 * | 12/2013 | Hastie et al. .................. | 714/54 |

OTHER PUBLICATIONS

Wikipedia's Multithreading (computer architecture) historical version published May 16, 2013 http://en.wikipedia.org/w/index.php?title=Multithreading_(computer_architecture)&oldid=555342720.*

* cited by examiner

*Primary Examiner* — Joseph Schell

(74) *Attorney, Agent, or Firm* — Daniel P. Morris, Esq.; Otterstedt, Ellenbogen & Kammer, LLP

(57) ABSTRACT

A method for detecting errors in hardware including running a transaction on a plurality of cores, wherein each of the cores runs a respective copy of the transaction, synchronizing the transaction on the cores, comparing results of the transaction on the cores, and determining an error in one or more of the cores.

20 Claims, 5 Drawing Sheets

DETECTION OF HARDWARE ERRORS USING REDUNDANT TRANSACTIONS FOR SYSTEM TEST

BACKGROUND

The present disclosure relates generally to the software arts, and more particularly, methods for using redundant transactions for testing a system.

Ensuring microprocessor chips are designed and implemented correctly (i.e., hardware debugging) involves extensive testing, which can be expensive and time consuming.

Generally, one part of the testing includes running a program on the chips and checking the results. This is typically called a functional test. Functional tests can be performed on experimental chips to test the design and manufacturing process, and on production chips to test whether the chip is acceptable for sale.

More particularly, hardware debugging typically involves directed tests specifically designed to exercise a chip, where signal traces of the chip under test can be analyzed. Gathering the signal traces typically involves having appropriate probes available on the hardware and a logic analyzer.

Given the signal traces of a failing chip, analysis of the chip can require days of work by a subject matter expert before a cause of a fault can be determined.

Development in testing methods typically seeks to decrease the testing time, the expense of testing, or both.

BRIEF SUMMARY

According to an embodiment of the present disclosure, a method for detecting errors in hardware includes running a transaction on a plurality of cores, wherein each of the cores runs a respective copy of the transaction, synchronizing the transaction on the cores, comparing results of the transaction on the cores, and determining an error in one or more of the cores.

According to an embodiment of the present disclosure, a method for detecting errors in hardware is embodied in a computer program product including a computer readable storage medium having computer readable program code embodied therewith, the computer readable program code comprising computer readable program code configured to detect errors in hardware.

According to an embodiment of the present disclosure, a system for testing hardware using multithreaded software includes a redundant transaction hardware configured to run a transaction of the multithreaded software redundantly, and a module configured to detect errors in the redundant transaction hardware based on differences detected between the transaction executed by the redundant transaction hardware.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a system can run one or more copies of a program, which use the same inputs, on different cores of a multi-core microprocessor chip using redundant transactional memory. The copies of the program execute as redundant transactions enabling comparisons of the complete output state of the different copies of the program automatically. The testing can be performed in hardware, making the test sensitive to timing related chip faults. In view of the foregoing, a test conducted using redundant transactions in hardware can reveal errors more quickly than other types of tests. That is, the test conducted using redundant transactions in hardware will typically fail earlier than other types of tests, reducing test time and debugging time.

Embodiments of the present disclosure relate to redundant transactions, with each transaction running a copy of a functional test. At the end of the redundant transactions, any difference in memory or register state between the copies indicates a possible chip fault.

Generally, a transaction is a code sequence that takes a state of a system from an initial state $S_i$ to another (e.g., final) state $S_f$. Redundant transactions run the same piece of code in two places. More particularly, a redundant transaction can be executed by two or more agents taking the initial state $S_i$ to a plurality of final states $S_f^0, S_f^1, S_f^2, \ldots S_f^n$, one final state for each execution. Redundant transactions can be used in a variety of applications based on the use of the final states. For example, a redundant transaction (e.g., wlog, running on two engines) that only commits if $S_f^0 = S_f^1$ can be used for achieving high reliability. In another example, a redundant transaction (e.g., wlog, running on two engines) that commits one of the states $(S_f^0)$ and publishes the difference between $S_f^0$ and $S_f^1$ can be used for race detection.

Figure 1:
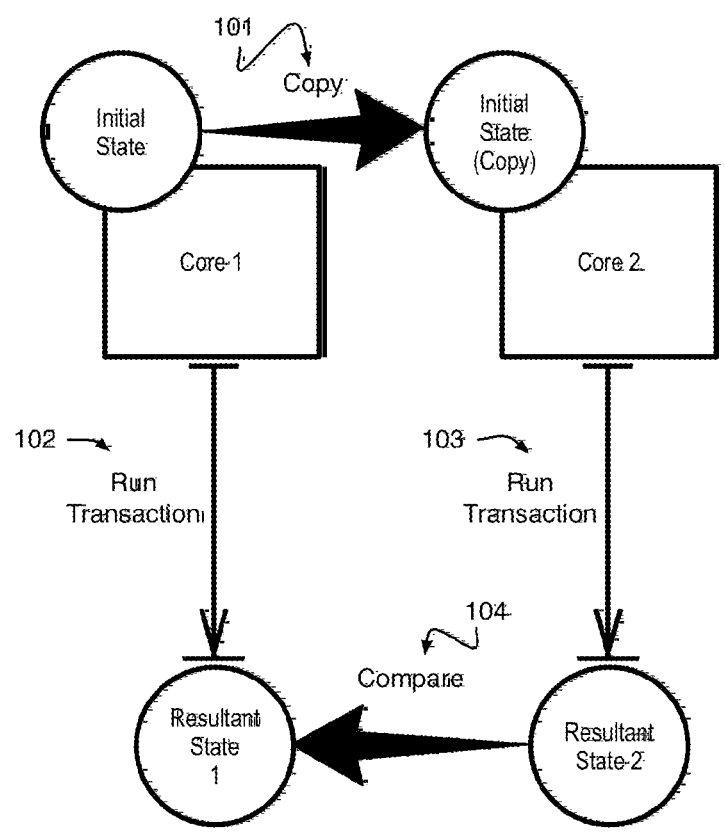
FIG. 1 is a diagram of a redundant transaction according to an exemplary embodiment of the present disclosure.

Referring to FIG. 1, given a redundant transaction running the same piece of code in two or more places, the results of each of the runs can be compared. In this context, a checkpoint can be implemented, which includes copying a state to a second core (101), running the transaction on both cores given the state for each core (102, 103), and comparing the results (104). It should be understood that embodiments of the present disclosure can be implemented with threads as well as transactions (or threads within a transaction), wherein a thread can be copied to the second core, run redundantly and compared based on the results.

Upon determining differences in the output of the cores based on the comparison of the results, the test system can take various actions, including characterizing cores and chips, debugging of core design, etc.

According to an exemplary embodiment of the present disclosure, hardware debugging can include the detection of variability between cores and the detection of marginal circuits in the cores.

In a test for detecting marginal circuits, existing tests (e.g., a functional test as described with reference to FIG. 1, that can be used for chip testing) can be run in redundant mode. In one example, the tests are run with varying transaction lengths. In another example, a reference core is run at nominal frequency and voltage while the frequency and voltage of the tested core can be varied, in some embodiments independently. Marginal circuits can be identified based on the test results (e.g., system states), wherein a marginal circuit can return a system state different than an expected state. It can be assumed that marginal circuits will fail more quickly than other circuits. Further, it should be understood that hardware tests can be more sensitive than software tests, where differences in the circuits may not affect results in ways that can be detected by software.

For example, a functional test can check a result to see if it was an expected result. The functional test can exercise a faulty circuit in a noticeable way, but still not affect the checked result. More particularly, in one example, a functional test stores its final result in a memory location X. During the running of the test, assume that a failure occurs, leading to register A being incorrect. At the end of the test, the result in memory location X is checked. Upon determining that the result in the memory location X is correct, the test passes. With redundant transactions, a test fails if a bad register value is determined.

Specific examples of a hardware debugging method include post-silicon validation, burn-in testing and initial testing, each of which can be expensive and time consuming.

In the case of hardware debugging, another exemplary method includes a deployment-time test. In this example, developing hard faults can be detected before the faults become user visible errors. One exemplary method of detecting a developing hard fault includes the periodic placement of a core in a redundant transaction, for example, with random locations in the code. Here, failures or different execution caused by developing or new hard faults can be detected.

There may be benign failures (e.g., incorrect behavior that does not affect a final result) that occur prior to a detectable error. According to an exemplary embodiment of the present disclosure, these failures are detected with redundant execution prior to an error occurring. Further, periodic redundant execution can reduce the total number of errors and undetected errors.

Moreover, also in the case of hardware debugging, a tested core can be placed under voltage/frequency stress to speed the test, that is, to reveal problems earlier than in a case under normal voltage/frequency parameters.

Once an error or failure is detected during the debugging test, these hard faults can be diagnosed on suspect hardware. For example, after detection of an error, test code can be run in redundant mode across pairs of cores in order to detect and isolate one or more cores producing the error.

According to an exemplary embodiment of the present disclosure, hardware debugging methods can be applied for testing logic bugs. In this example, a reference core can be implemented, for example, through back generation, simplified, or software simulated. Given the reference core, a test can be run as a redundant transaction on a core under test and the reference core.

According to an exemplary embodiment of the present disclosure, a reference core and core under test can be the same core run in different modes. For example, the reference core can be run in ST mode (in this mode, one thread runs on the core), while the core under test is in run in a SMT 2/4/8 mode (simultaneous multithreading, wherein a number of threads (e.g., 2/4/8) run on the core concurrently).

In the case of tests for logic bugs, real errors can be differentiated from under-defined behavior by, for example, by human analysis flagging valid differences. When valid differences are flagged, such behavior is excluded for future tests. For example, if the instruction "foo" behaves differently in the two implementations, the difference is valid, then "foo" can be excluded in redundant parts of the tests.

Figure 2:
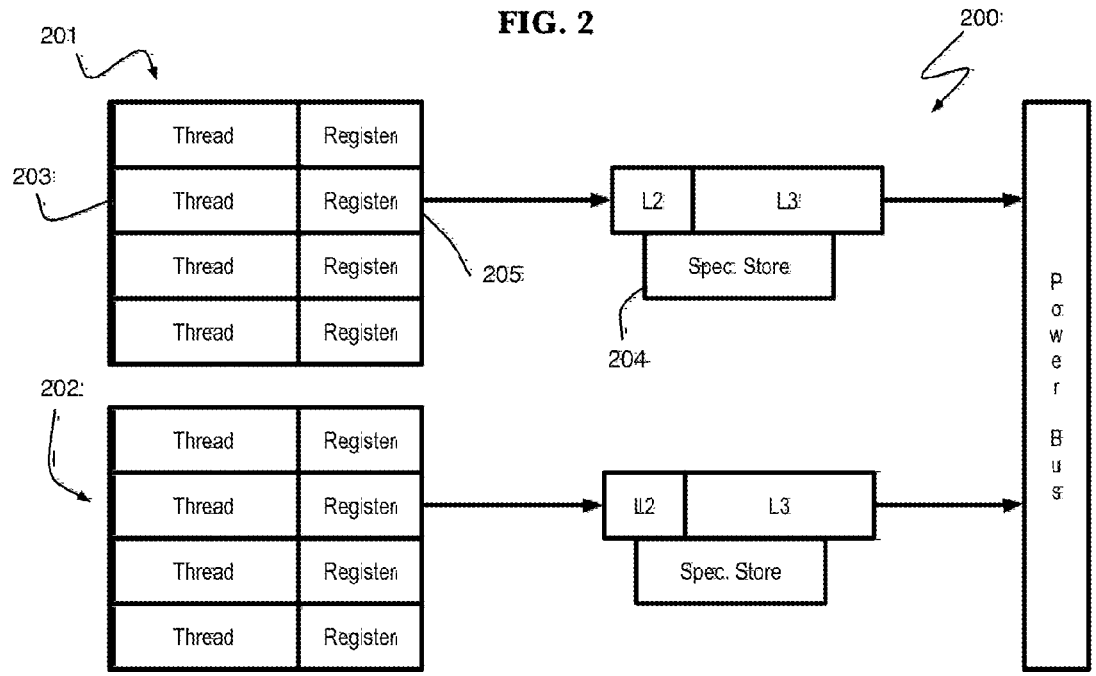
FIG. 2 is a diagram of a multi-core processor system according to an exemplary embodiment of the present disclosure.

According to an embodiment of the present disclosure, in the case of a multi-core processor 200, wherein each core 201 and 202 is running a plurality of threads (e.g., 203), each thread in the transaction reaches a Rend instruction indicating an end of a redundant transaction (see FIG. 2). Once each thread has been completed, contents of a each thread's speculative store 204 and a state of the core's register 205 (hereinafter register state) are compared. If the comparison fails, e.g., the content of the speculative store and the register state are different, the transaction can be aborted, wherein any changes in speculative stores can be discarded. Further, an error handler can be invoked.

Figure 3:
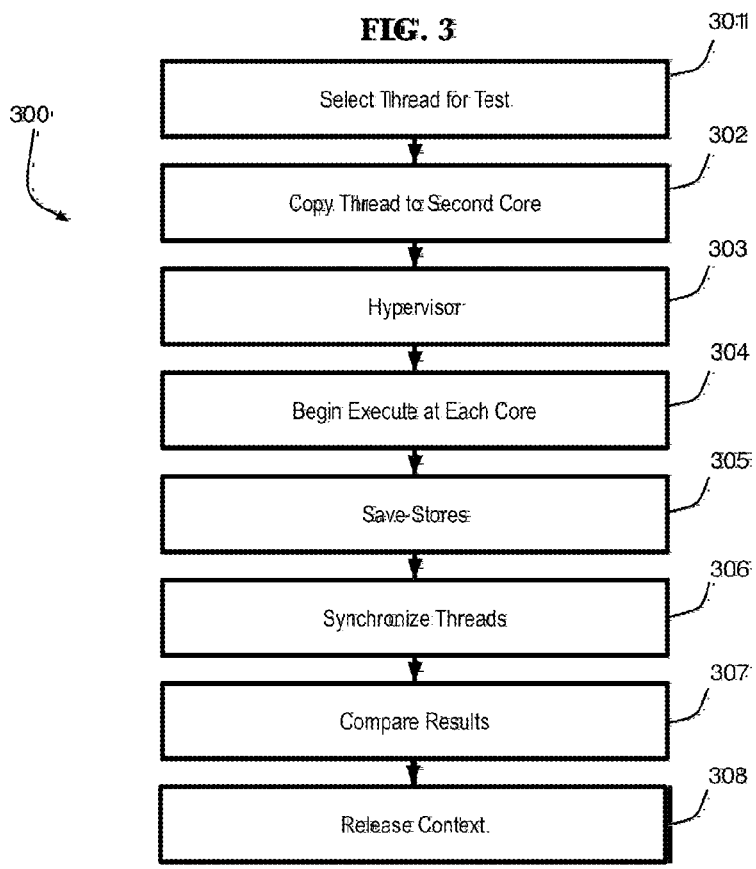
FIG. 3 is a flow diagram of a method of performing a redundant transaction for testing hardware according to an exemplary embodiment of the present disclosure.

According to an exemplary embodiment of the present disclosure, FIG. 3 shows a method for testing a core (300). In the core under test, a thread (referred to as the primary thread) is selected from another core for redundant execution (301). The register associated with the primary thread in the other core is copied to the core under test (302). The thread, now copied to the core under test (referred to as the secondary thread), enters a hypervisor call and an R-begin instruction is executed (303). The primary and secondary threads are executed by the respective cores (304) (e.g., the same code is executed by one or more cores). Any store operation of the threads is saved to a speculative store of the respective core (305). A thread's speculative store is not visible to other threads. The progress of each thread is periodically synchronized at a specific instruction (306). For example, as each thread executes an Rend instruction of a transaction, the thread waits for other any lagging thread to complete the transaction. Once each thread executes the Rend instruction, the speculative stores and the register states of the different cores can be compared (307). In one exemplary embodiment, at block 308, one thread is committed while another thread is released, and the difference is flagged. Here, the test can record or log data about the thread that failed the comparison. This data can include, for example, a start and end program counter (PC) of the thread, a timestamp of when the thread ran, and which cores the thread was run on, etc.

In another exemplary embodiment, if the comparison fails, the transaction can be aborted and changes in the speculative store can be discarded. Further, an error handler can be invoked. A context of the secondary thread can be released (308).

Figure 4:
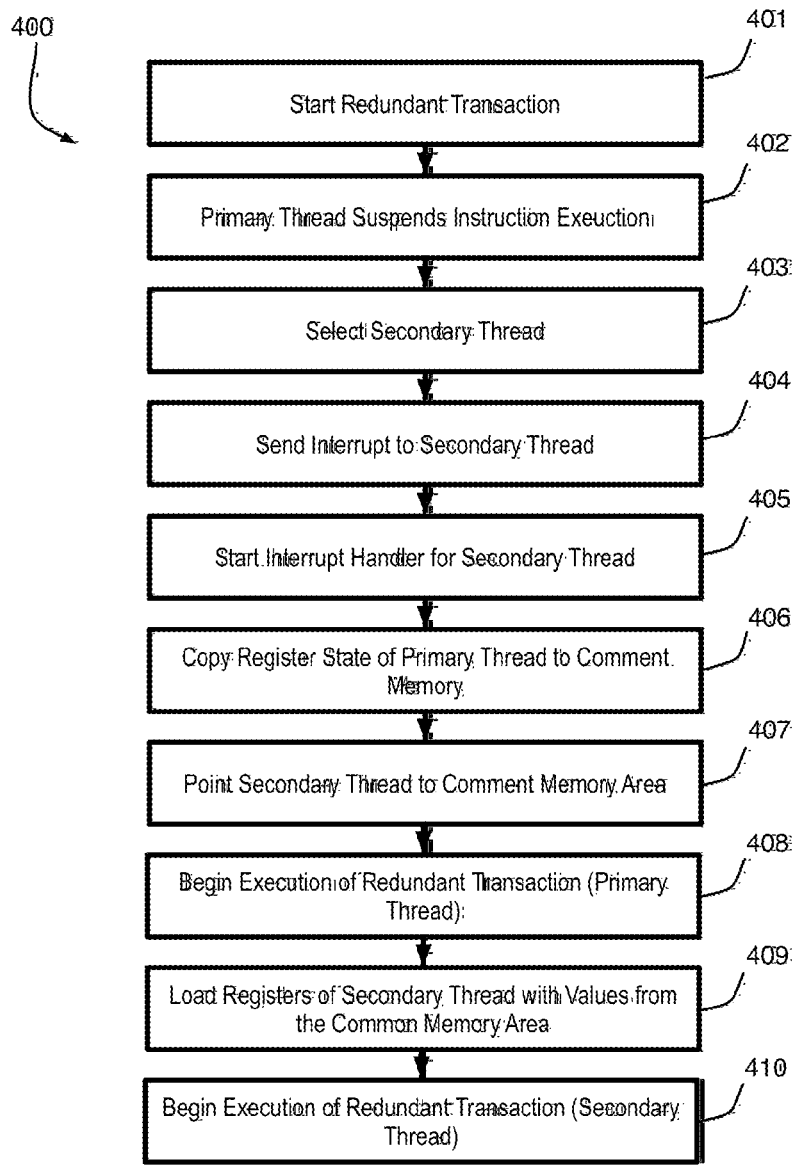
FIG. 4 is a flow diagram of a method for initializing a redundant transaction according to an exemplary embodiment of the present disclosure.

According to an exemplary embodiment of the present disclosure, FIG. 4 shows a method for testing a core (400), which includes running the same piece of code in two or more places, the results of each of the runs can be compared. In this context, a checkpoint can be implemented, which includes copying a state to a second core or thread (401), running the transaction on both cores/threads given the state (402), synchronizing the transaction on each core or thread (403) and comparing the results (404).

A comparison of the threads can be performed at a synchronized instruction (e.g., an Rend instruction). The Rend instruction corresponds to the end of the redundant transaction.

Figure 5:
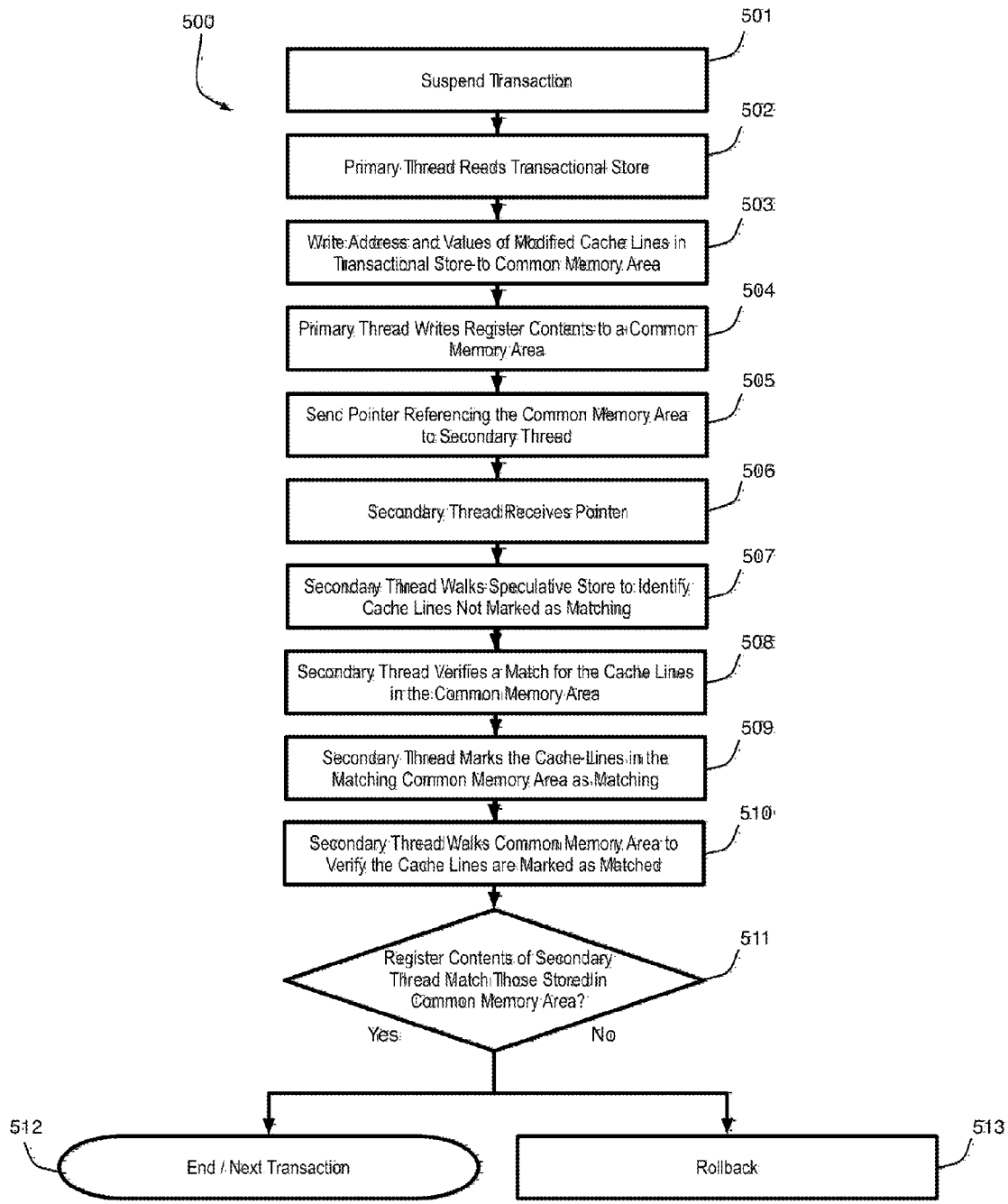
FIG. 5 is a flow diagram of method of comparing results of a redundant transaction executed on different cores according to an exemplary embodiment of the present disclosure.

According to an embodiment of the present disclosure, the comparison (see FIG. 5) includes suspending a transaction upon reaching a certain point, such as an Rend instruction noting the end of the transaction (501); for example, when primary thread reaches its Rend instruction, it suspends the transaction and waits for the secondary thread. It should be understood that the secondary thread can finish before the primary thread in some instances. Once the threads are synchronized, the primary thread can read the address of the modified cache lines in its transactional store (502) and write the list of addresses and values of modified cache lines to the common memory area (503). The primary thread writes its registers to the common memory area (504) and sends a bus transaction (e.g., icswx) to the secondary thread with a pointer to the common memory area (505). In a case where the secondary thread reaches its Rend before the primary thread, secondary thread waits to receive the bus transaction from the primary thread (506). The secondary thread walks its speculative store identifying each cache line in the speculative store of the secondary thread that is not marked as matching (507), and searches the corresponding cache line in the common memory area to verify a match for the data (508). The secondary thread marks that cache line in the common area as matching (509). The secondary thread then walks the common area to verify that all cache lines there are marked as matched (510). The secondary thread also matches its registers to the registers saved in the common memory area (511). If all the cache lines in the speculative store of the secondary thread and all cache lines in the common memory area and all the registers match, then the transaction is successful (512), otherwise, a rollback can be performed wherein the transaction is resumed and aborted (513).

Referring now to the management of a speculative state; different from transactional memory, transactions are not aborted on cache line conflicts between the primary and secondary threads. Instead, each thread can maintain its own copy of each cache line. In this way transactions can be aborted in limited cases, for example, when there is a speculative store overflow, in the case of miscomparisons, and conflicts with a thread outside of the redundant transaction.

As above, transactions can be aborted upon determining a speculative storage overflow, in the case of a non-deterministic operation, based on thread non-determinism, permanent faults, or transient faults.

According to an exemplary embodiment of the present disclosure, a system can be optimized for performing redundant transactions. For example, one or more threads can perform on the fly matches, wherein a thread that writes to a cache line, marks it as "not matched" and sends updated cache line to other thread. In this example, when a thread receives an updated cache line (e.g., an address and value), the thread compares it to its own contents (e.g., register or speculative store), and if a match is determined, the thread can mark the cache line as "matched" and send updated value back to a thread sending the updated cache line. Note, that in this example, each update can take three bus transactions (e.g., A→B (may not match because B does not have it), B→A matches, A→B matches).

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor," "circuit," "module," or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system (e.g., a multi-core system according to FIG. 1.1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module for copying a thread from a first core to one or more second cores, at least one second module for running the transaction on the cores, a third module for synchronizing the threads on the different cores, a fourth module for comparing results of the threads on the different cores, and a fifth module for determining errors in one or more of the cores.

Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 6:
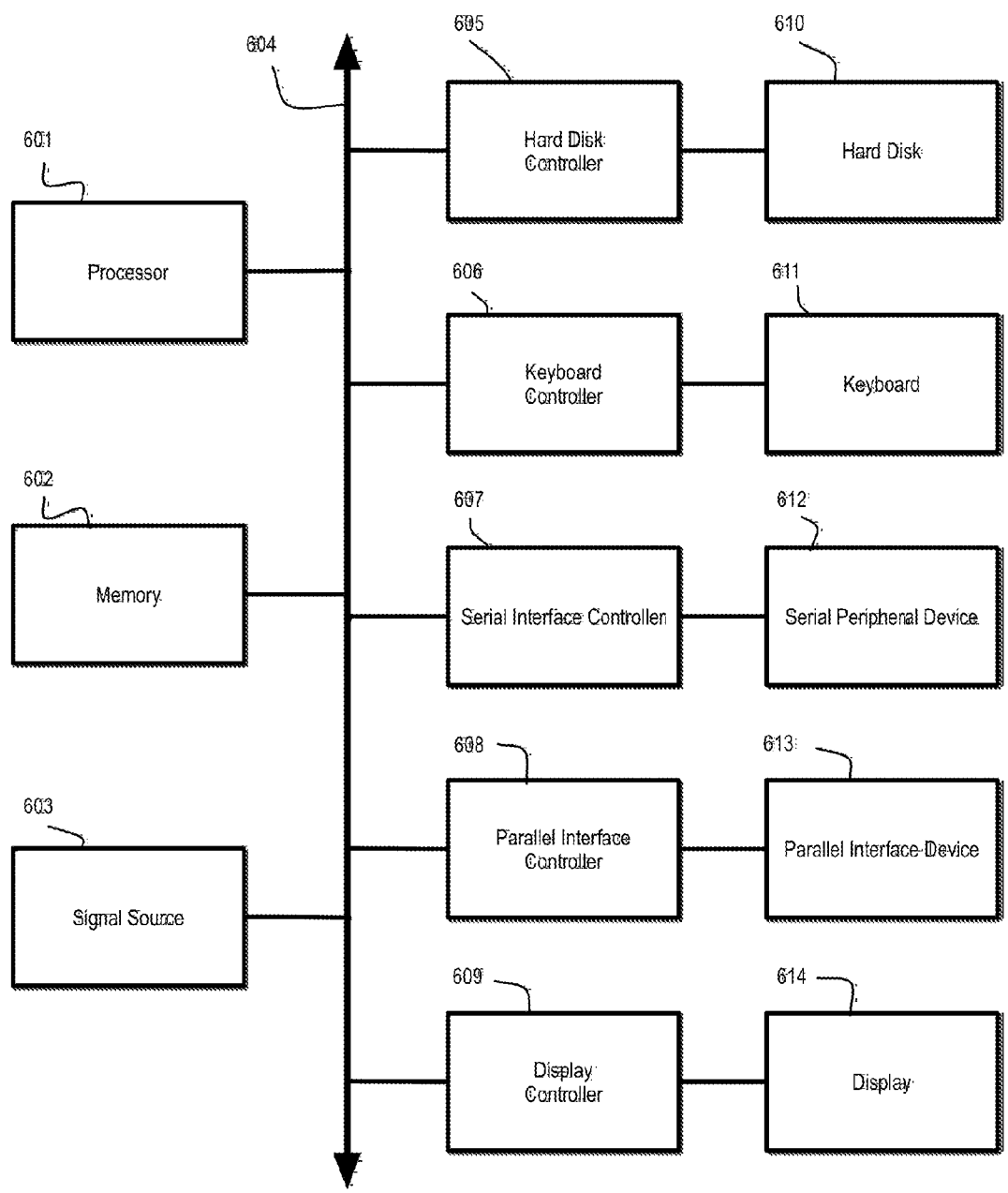
FIG. 6 is a block diagram depicting an exemplary computer system for performing redundant transactions for testing hardware according to an embodiment of the present disclosure.

For example, FIG. 6 is a block diagram depicting an exemplary computer system for using redundant transactions for detecting errors in hardware according to an embodiment of the present disclosure. The computer system shown in FIG. 6 includes a processor 601, memory 602, signal source 603, system bus 604, Hard Drive (HD) controller 605, keyboard controller 606, serial interface controller 607, parallel interface controller 608, display controller 609, hard disk 610, keyboard 611, serial peripheral device 612, parallel peripheral device 613, and display 614.

In these components, the processor 601, memory 602, signal source 603, HD controller 605, keyboard controller 606, serial interface controller 607, parallel interface controller 608, display controller 609 are connected to the system bus 604. The hard disk 610 is connected to the HD controller 605. The keyboard 611 is connected to the keyboard controller 606. The serial peripheral device 612 is connected to the serial interface controller 607. The parallel peripheral device 613 is connected to the parallel interface controller 608. The display 614 is connected to the display controller 609.

In different applications, some of the components shown in FIG. 6 can be omitted. The whole system shown in FIG. 6 is controlled by computer readable instructions, which are generally stored in the hard disk 610, EPROM or other non-volatile storage such as software. The software can be downloaded from a network (not shown in the figures), stored in the hard disk 610. Alternatively, a software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present disclosure can be implemented as a routine that is stored in memory 602 and executed by the processor 601 to process the signal from the signal source 603. As such, the computer system is a general-purpose computer system that becomes a specific purpose computer system when executing the routine of the present disclosure.

Although the computer system described in FIG. 6 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method for detecting errors in hardware, the method comprising:
running a transaction on a plurality of cores, wherein each of the cores runs a respective copy of the transaction;
periodically synchronizing the transaction on the cores; and
comparing results of the transaction on the cores;
determining an error in one or more of the cores;
wherein synchronizing the transaction further comprises:
suspending the transaction running on each of the cores at a same instruction;
reading an address of a modified cache line in a transactional store of a first core of the plurality of cores;

writing the address and a value at the address as first data to a common memory area shared by the cores;

writing data from registers of the first core to the common memory area; and sending a bus transaction including a pointer to the common memory area to a second core of the plurality of cores.

2. The method of claim 1, wherein the first and second cores are components of a multi-core processor.

3. The method of claim 1, further comprising copying a thread of the transaction from a first core of the plurality of cores to a second core of the plurality of cores before running the transaction on the plurality of cores, wherein the transaction includes at least one thread.

4. The method of claim 1, further comprising:
verifying a match for the first data to second data stored in a speculative store of the second core; and
marking, by the second core, cache lines in the common area corresponding to matched first and second data.

5. The method of claim 4, wherein verifying the match further comprises:
walking, by the second core, the speculative store of the second core and identifying one or more cache lines in the speculative store of the second core that are not marked as matching; and
searching corresponding cache lines in the common memory area containing the first data to verify the match.

6. The method of claim 4, further comprising verifying that all the cache lines in the common memory area are marked as matched.

7. The method of claim 1, further comprising matching data from registers of the second core to data from the registers of the first core written to the common memory area.

8. The method of claim 1, further comprising determining a successful transaction upon:
matching all cache lines in a speculative store of the second core and all cache lines of the first core written in the common memory area; and
matching all registers of the second core to all register fails of the first core written in the common memory area.

9. The method of claim 1, wherein comparing results of the transaction on the cores further comprises recording data about a thread running on a given one of the cores upon determining a difference between the results of the transaction on the cores.

10. The method of claim 9, wherein the data includes at least one of a start and end program counter (PC) of the transaction, a timestamp of when the transaction ran, and which cores the transaction was run on.

11. A computer program product for detecting errors in hardware, the computer program product comprising:
a non-transitory computer readable storage medium having computer readable program code embodied therewith, the computer readable program code comprising:
computer readable program code configured to run a transaction on a plurality of cores, wherein each of the cores runs a respective copy of the transaction;
computer readable program code configured to periodically synchronize the transaction on the cores;
computer readable program code configured to compare results of the transaction on the cores; and
computer readable program code configured to determine an error in one or more of the cores;

wherein computer readable program code configured to synchronize the transaction on the cores further comprises:
computer readable program code configured to suspend the transaction running on each of the cores at a same instruction;
computer readable program code configured to read an address of a modified cache line in a transactional store of a first core of the plurality of cores;
computer readable program code configured to write the address and a value at the address as first data to a common memory area shared by the cores;
computer readable program code configured to write data from registers of the first core to the common memory area; and
computer readable program code configured to send a bus transaction including a pointer to the common memory area to a second core of the plurality of cores.

12. The computer program product of claim 11, wherein the first and second cores are components of a multi-core processor.

13. The computer program product of claim 11, further comprising
computer readable program code configured to copy a thread of the transaction from a first core of the plurality of cores to a second core of the plurality of cores before running the transaction on the plurality of cores, wherein the transaction includes at least one thread.

14. The computer program product of claim 11, further comprising:
computer readable program code configured to verify a match for the first data to second data stored in a speculative store of the second core; and
computer readable program code configured to mark, by the second core, cache lines in the common area corresponding to matched first and second data.

15. The computer program product of claim 14, wherein verifying the match further comprises:
computer readable program code configured to walk, by the second core, the speculative store of the second core and identifying one or more cache lines in the speculative store of the second core that are not marked as matching; and
computer readable program code configured to search corresponding cache lines in the common memory area containing the first data to verify the match.

16. The computer program product of claim 14, further comprising computer readable program code configured to verify that all the cache lines in the common memory area are marked as matched.

17. The computer program product of claim 11, further comprising computer readable program code configured to match registers of the second core to the registers of the first core written to the common memory area.

18. The computer program product of claim 11, further comprising computer readable program code configured to determine a successful transaction upon matching all cache lines in a speculative store of the second core and all cache lines of the first core written in the common memory area, and matching all registers of the second core to all register fails of the first core written in the common memory area.

19. The computer program product of claim 11, wherein the computer readable program code configured to compare results of the transaction on the cores further comprises computer readable program code configured to record data about a thread running on a given one of the cores upon determining a difference between the results of the transaction on the cores.

20. The computer program product of claim 19, wherein the data includes at least one of a start and end program counter (PC) of the transaction, a timestamp of when the transaction ran, and which cores the transaction was run on.

* * * * *